No. 684,610. Patented Oct. 15, 1901.
R. B. MARSHKE.
COMBINED SCREEN AND STORM DOOR.
(Application filed Apr. 8, 1901.)
(No Model.)
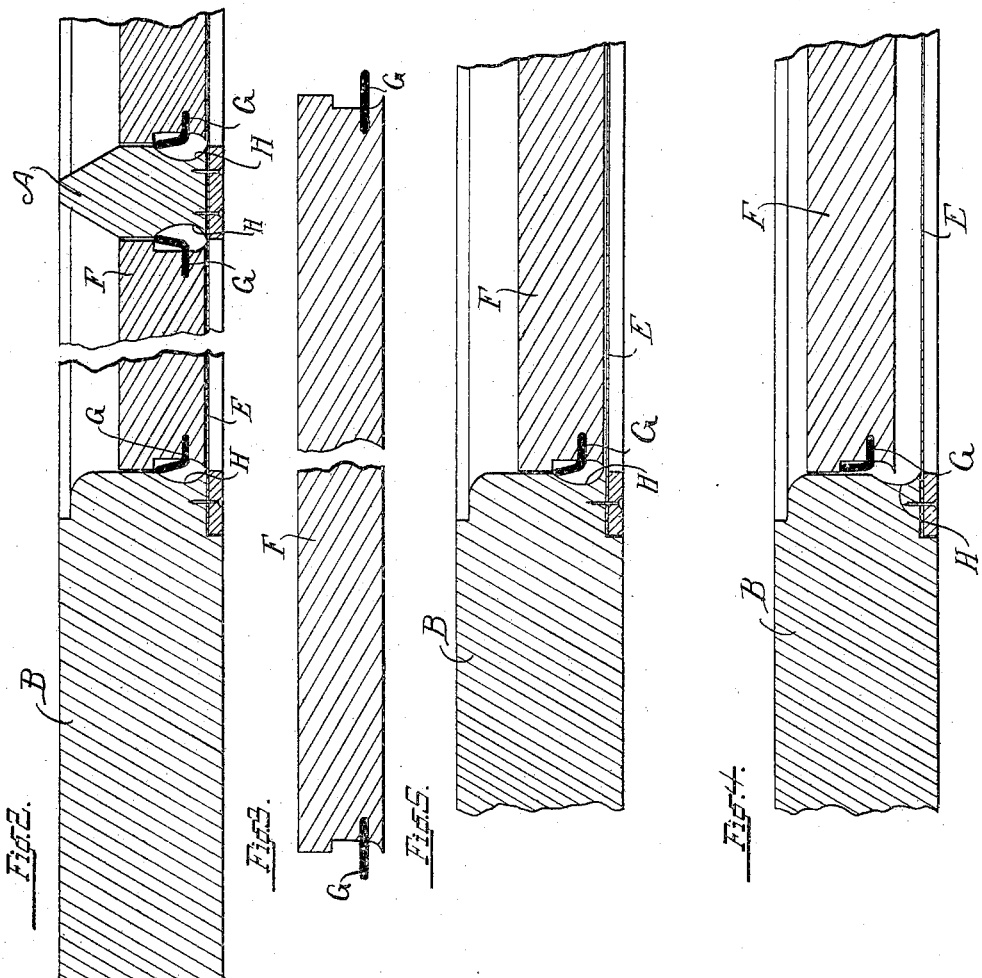
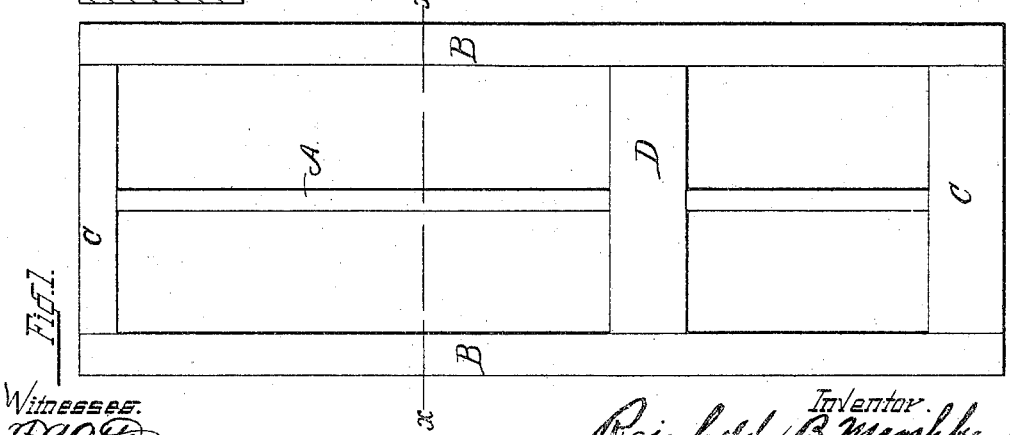
Witnesses.
Inventor.
Reinhold B. Marshke
By Enzie & Wheeler
Attorneys

UNITED STATES PATENT OFFICE.

REINHOLD B. MARSHKE, OF CHAFFEE, NORTH DAKOTA.

COMBINED SCREEN AND STORM DOOR.

SPECIFICATION forming part of Letters Patent No. 684,610, dated October 15, 1901.

Application filed April 8, 1901. Serial No. 54,784. (No model.)

*To all whom it may concern:*

Be it known that I, REINHOLD B. MARSHKE, a citizen of the United States, residing at Chaffee, county of Cass, and State of North Dakota, have invented new and useful Improvements in a Combined Screen and Storm Door, of which the following is a specification.

My invention relates to improvements in combined screen and storm doors; and it pertains more especially to the construction and arrangement of the removable panels, which are detachably secured in the frame of the door in front of the wire screens and to the elastic fastening-pieces interposed between the edges of the removable panels and the edges of the surrounding frame.

The construction of my invention is explained by reference to the accompanying drawings, in which—

Figure 1 represents the front view of a door comprising my improvements. Fig. 2 is a horizontal section drawn on line $x$ $x$ of Fig. 1. Fig. 3 represents a transverse section of one of the panels removed from the door-frame. Fig. 4 is a detail showing the position of the elastic fastening-pieces as the panel is being forced in place into the apertures of the inclosing door-frame, the position assumed by the retaining-pieces when said panels are in place being shown in Figs. 2 and 5. Fig. 5 is a detail view showing the retaining-pieces resting in the locking-apertures.

Like parts are identified by the same reference-letters throughout the several views.

The frame A comprises the vertical side pieces B, cross-pieces C, and central pieces D, all of which are joined together in the ordinary manner.

E represents the ordinary pieces of wire-screen cloth, which are secured to the inner surface of the door-frame in the usual manner.

F represents the movable panels, which are provided around their marginal edges with elastic retaining-strips G. The inner marginal edges of the door-frame are grooved out longitudinally on all sides to form concave recesses H for the reception of the free edges of the elastic fastening-pieces G when said panels F are in place in the frame. The panels F are also provided around their marginal edges with recesses I for the reception of the free edges of said elastic fastening-pieces, which edges are folded back therein temporarily as said panels are being inserted in the apertures of the frame, as indicated in Fig. 4. It will be understood that when said panels are in place, as shown in Fig. 2, said pieces G will be thrown out by their own elasticity into the position shown in such figure, in which latter position their free edges impinge against the opposing surfaces of said concave recesses and hold said panels securely in place, while they also serve the secondary purpose of packing or weather strips to exclude air.

It will be understood that by this device a single door is adapted to serve the twofold purpose of a screen-door in summer to exclude insects and a storm-door in winter to exclude cold, whereby the expense of two doors and the necessity of taking down one door and putting up another for such purposes is avoided.

Having thus described my invention, what I claim as new, and desire to secure by Letters Patent, is—

1. In that class of doors, comprising a door-frame, screens and removable panels, adapted to be temporarily secured in said frame in front of said screens, the combination with the marginal edges of the removable panels; of elastic retaining-pieces, adapted, when said panels are in place in the frame, to impinge against the opposing edges of said frame and hold said panels in place, substantially as set forth.

2. In a combined screen and storm door, a door-frame having the inner marginal edges of its screen-apertures provided with longitudinal recesses serving as bearings for the fastening-pieces of the removable panels, in combination with permanently-attached screens; removable panels; and elastic panel-retaining pieces, said elastic pieces being permanently secured at one edge to the edges of said panels, and adapted, when said panels are in place, to impinge at their opposite edges against the concave walls of said recesses, and hold said panels in place, all substantially as and for the purpose specified.

In testimony whereof I affix my signature in the presence of two witnesses.

REINHOLD B. MARSHKE.

Witnesses:
J. B. VAIL,
C. F. VAIL.